UNITED STATES PATENT OFFICE.

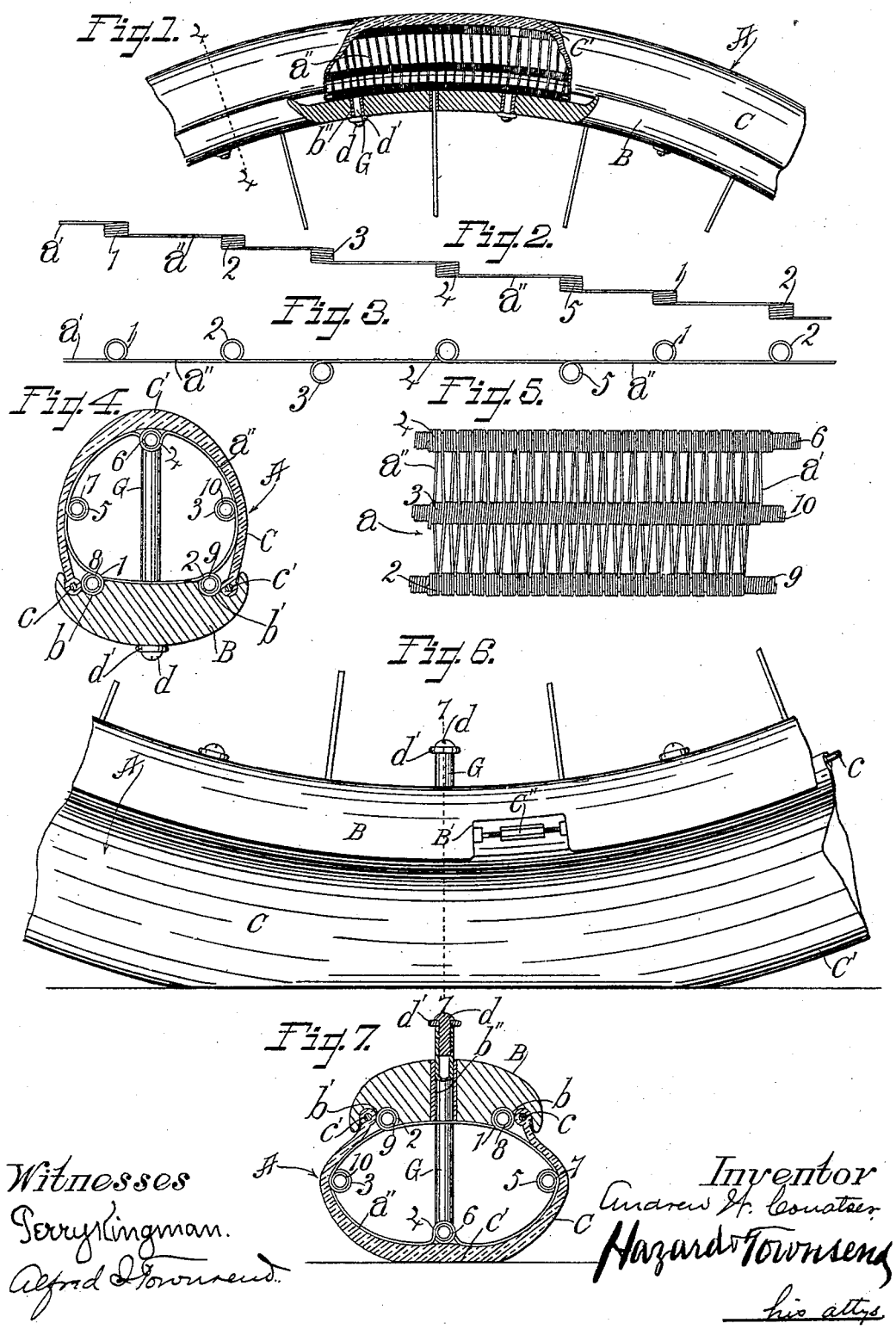

ANDREW W. CONATSER, OF COMPTON, CALIFORNIA.

TIRE.

SPECIFICATION forming part of Letters Patent No. 633,685, dated September 26, 1899.

Application filed October 6, 1896. Serial No. 608,051. (No model.)

*To all whom it may concern:*

Be it known that I, ANDREW WILSON CONATSER, a citizen of the United States, residing at Compton, in the county of Los Angeles and State of California, have invented new and useful Improvements in Tires, of which the following is a specification.

My invention relates particularly to that class of tires known as "spring-tires" and which are designed to supplant the pneumatic tire, which is highly unsatisfactory on account of its liability to puncture and to wear out.

The object of my invention is to produce a bicycle-tire which will be light, simple, cheap, and durable, one which will give the desired resilience without any liability or danger of breakage, and one in which the continued compression and relaxation of the springs will not destroy their resilience, so as to cause them to quickly become crystallized and break.

There are many difficulties in the way of producing a successful spring-tire, which difficulties I discovered by practical experiments. In the first place the device must be very light. In the second place the springs must be so arranged that when the tire is flattened there shall be no short bend in any portion of the spring; but, on the contrary, there must be an even tension exerted throughout a long length of the spring, to thereby avoid destroying the resilience of the spring, the crystallization of the metal, and consequently breakage of the spring within a short time.

In conducting my experiments, which extended over a considerable length of time, I found that when the structure is so arranged that one of the coils uncoils while the other coils tighten it is impossible to secure an even tension between the coils, the result being that the coil which uncoils does not exert the same resistance as those coils which tighten, and consequently the greatest amount of bending takes place in such coil, and therefore the spring at this point becomes weakened and crystallizes quicker than at any other point. By my improved construction, in which all of the coils tighten when strain is placed upon the periphery of the tire, the resistance of any one coil against compression is as great as that of any of the others, and consequently uniform action is secured and there is not the same liability of crystallization or weakening of the spring that there is when one or more of the coils loosen as the other coils tighten.

My invention comprises the various features of construction and combinations of parts hereinafter fully set forth, whereby I am enabled to produce a spring-tire of great simplicity and resilience, one which is adapted for use with bicycles or heavy vehicles, and which will be of unparalleled durability.

The accompanying drawings illustrate my invention, whereby I accomplish these objects.

Figure 1 is a fragmental side elevation of my invention applied to a bicycle-wheel. In this view a portion of the casing of the tire is removed in order to show the construction. Fig. 2 is a plan view of the wire coiled in the manner which is necessary to produce my improved tire. Fig. 3 is a side elevation of the same. Fig. 4 is a cross-section of the tire and rim on line 4 4, Fig. 1. Fig. 5 is a fragmental side elevation of the spring portion of my tire with the casing removed therefrom. Fig. 6 is a fragmental side elevation showing the tire partially compressed as it appears when in use. Fig. 7 is a cross-section on line 7 7, Fig. 6.

In the drawings, A represents my improved spring-tire, which is composed of a hollow skeleton tube-like structure $a$, preferably formed of a single length of spring-wire $a'$, twisted to form coils 1, 2, 3, 4, and 5, connected by intermediate uncoiled sections $a''$. The wire which I have employed for this purpose is that known to the trade as "piano-wire," and is steel wire possessing great resilience. In preparing this wire for the manufacture of my improved tire I form it into series of sets of coils. Each set of coils (see Figs. 2 and 3) is composed of two coils 1 and 2, formed by twisting the wire in the same direction, and three coils 3, 4, and 5, formed by twisting the wire of each coil in a direction the reverse from that of the coil immediately at the rear and of the coil immediately in advance. When a sufficient length of wire is twisted to form a portion of the tire, the coils are threaded upon straight continuous coils 6, 7, 8, 9, and 10, so that the coils 1, 2, 3, 4, and 5 will form a skeleton tube-like structure the walls of which are formed by the longitudinal rows of coils 1, 2, 3, 4, and 5 and by the intermediate uncoiled portions of the wire, as clearly shown in the drawings.

When a sufficient length of the tire is formed to encircle a bicycle-wheel, the ends of the straight coils are connected to each other by any suitable means, and the device is then placed in position upon the rim B of the wheel, with the coils 1 and 2 resting in the grooves $b$ and $b'$, provided therefor. These grooves are sufficiently large to chamber the coils and to also chamber the edge wires $c\ c'$ of the casing C, which is used to cover the exterior of the skeleton-like structure formed by the spring-wire. This casing is of rubber or any other suitable material, having its central portion C' thickened to prevent the casing from speedily wearing out. The wires $c\ c'$ are secured to the edges of the casing and extend entirely around the rim of the wheel and have their ends provided with right and left hand screw-threads and connected together by means of a turnbuckle C''. A small portion of the rim is cut away, as at B', Fig. 6, to give access to the turnbuckle to allow it to be tightened or loosened, as may be required.

In order to avoid any liability of the tire being turned or twisted toward one side when turning a corner or encountering an obstruction, I provide the rim of the wheel with radial guideways $b''$, within which reciprocate short sections of tube G, the upper ends of which are by eyes secured to the top row of coils 4 and pass down through the interior of the tire, the guide-openings, and are secured at the lower end by means of a screw $d$, having a washer $d'$, of rubber, leather, or other suitable material, arranged between the head of the screw and the rim of the wheel, so as to muffle any noise which might be otherwise produced. Thus the tube will receive any side strain and tend to always hold the top row of coils 4 in the exact center of the rim.

In making my invention I have employed a machine for twisting the coils 1, 2, 3, 4, and 5 in the wire, and have then twisted the coils 6, 7, 8, 9, and 10 by a separate machine. The coils 6, 7, 8, 9, and 10 are made of sufficient length to form a tire, and I then begin at one end of the wire $a'$ and thread the coil 1 of such wire upon the straight coil 8. I then thread coil 2 upon the straight coil 9, coil 3 upon straight coil 10, coil 4 upon coil 6, coil 5 upon coil 7, and repeat, each spring-coil being threaded upon its respective straight coil until the structure is sufficiently long to form a tire which will encircle the rim of the wheel. Then the ends of the straight coils are secured together by suitable means and the structure is placed upon the rim of the wheel, with the longitudinal row of coils 1 2 resting in the grooves $b$ and $b'$ in the rim. The guide-tubes are then inserted into the guideways and are secured to the row of coils 4. Then the cover C is placed upon the structure, with the wires $c\ c'$ seated in the grooves $b\ b'$, and the turnbuckle C'' is screwed upon the ends of the wires, drawing them firmly into the groove and holding the casing rigidly in place. The device is then ready for use.

It will be observed that by my improved construction when the tire is flattened by pressure applied upon the coils 4 the result is that each of the coils 1, 2, 3, 4, and 5 is tightened, thus increasing the strength of the springs as the compression is increased. By reason of the coils tightening the strain is distributed throughout the entire length of the coiled portion of the spring and there is no liability whatever of forming a short bend in the spring, which would quickly destroy the resiliency and cause it to break.

By practical experiments I have demonstrated that after being contracted and expanded a great number of times the structure still retains its resilience and returns to its original shape. In fact, the structure may be set in a vise and flattened, and unless sufficient force is applied to flatten the coils it will fully return to its original shape after the pressure is removed and with its strength unimpaired.

It is obvious that by using different sizes of wire the strength of the tire may be adapted for carrying different loads, so that my invention may be applied not only to bicycles, but to buggies, heavy wagons, or trucks, as may be desired.

It is to be understood that while I have shown a tire having five longitudinal rows of coils still my invention is not limited to any especial number of rows, the particular feature being that any change in shape of the tire is taken up by the coils.

In applying my invention to bicycles the wooden rims now in use may be employed, a strip of wood or other material being secured in the groove of the rim to fill the space between the coils 1 2.

Now, having described my invention, what I claim as new, and desire to secure by Letters Patent, is—

1. A tire comprising a tube-like structure formed of spring-wire formed into coils connected with each other by short lengths of uncoiled wire, some of the coils being twisted in one direction and the uncoiled members which adjoin it being tangent with the coil, and the other coils being twisted reversely from the first-mentioned coils and their adjoining uncoiled members being bent upon themselves to enter said coil reversely substantially as set forth whereby when the tire is flattened at the periphery all the coils will tighten.

2. A tire comprising a tube-like structure having a longitudinal row of coils; and a core formed of a continuous coil of wire inserted longitudinally through the row of coils substantially as set forth.

3. A tire formed of spring-wire twisted to form a hollow tube-like structure having five longitudinal rows of coils, and a core formed of a continuous coil of wire inserted longitudinally through each row of coils.

4. A tire comprising a hollow tube-like structure formed of spring-wire twisted to form series of coils connected by uncoiled portions of the wire, two of the coils being twisted in the same direction to form the base, two side coils each twisted in reverse directions from the base-coils, and a central or top coil twisted in reverse direction from the side coils.

5. A wire for forming tires formed into successive sets of coils, each set comprising five coils, two adjacent coils being twisted in the same direction, and the three coils following each being twisted in reverse direction from its respective coil immediately in advance and also at the rear.

6. The combination set forth of the rim of the wheel; a skeleton tube-like structure formed of spring-wire provided with five longitudinal rows of coils, a straight coil of wire passing longitudinally through each row; radial guideways provided in the rim; and suitable guides secured to the outer row of coils and sliding in the guideways.

ANDREW W. CONATSER.

Witnesses:
ALFRED I. TOWNSEND,
JAMES R. TOWNSEND.